United States Patent [19]

Stephenson et al.

[11] 4,360,068
[45] Nov. 23, 1982

[54] FURROWING TOOL

[75] Inventors: Earle W. Stephenson, Latrobe; Clyde G. Hutzell, Schellsburg, both of Pa.

[73] Assignee: Kennametal Inc., Latrobe, Pa.

[21] Appl. No.: 130,155

[22] Filed: Mar. 13, 1980

Related U.S. Application Data

[60] Division of Ser. No. 877,045, Feb. 13, 1978, Pat. No. 4,216,832, which is a continuation of Ser. No. 699,491, Jun. 24, 1976, abandoned.

[51] Int. Cl.³ .............................................. A01B 33/10
[52] U.S. Cl. ................................... 172/540; 172/123; 172/747; 299/89; 37/94
[58] Field of Search ................. 172/55, 123, 120, 540, 172/548, 556, 747; 37/189, 94, 190, 91–97; 299/91, 93, 89; 125/15, 22; 76/112; 83/839; 29/105; 144/240, 2 N; 175/410, 411

[56] References Cited

U.S. PATENT DOCUMENTS

| | | | |
|---|---|---|---|
| 3,268,259 | 8/1966 | Snipe | 299/91 |
| 3,419,976 | 1/1969 | Reising | 172/123 |
| 3,519,309 | 7/1970 | Engle | 299/91 |
| 3,570,566 | 3/1971 | McCreery | 144/2 N |
| 3,663,063 | 5/1972 | Johnmeyer | 299/86 |
| 3,737,199 | 6/1973 | Stephenson | 299/89 |
| 3,945,681 | 3/1976 | White | 299/86 |
| 3,995,699 | 12/1976 | Blucher | 172/555 |
| 4,043,404 | 8/1977 | Sorlie | 172/555 |
| 4,059,161 | 11/1977 | Smith | 172/120 |
| 4,094,362 | 6/1978 | Hild | 172/120 |

FOREIGN PATENT DOCUMENTS 149720 6/1951 Australia .
242945 11/1962 Australia .

*Primary Examiner*—Richard J. Johnson
*Attorney, Agent, or Firm*—Lawrence R. Burns; Ira D. Blecker

[57] ABSTRACT

A rotary tool is disclosed which is adapted to be mounted on a machine having power drive means and movable over a field surface to produce furrows therein. The rotary tool comprises bit elements mounted in abutting relation from a peripheral surface of a disc and having compacts of hard wear resistant material which form the leading edge of the bit elements that are to engage the earth.

5 Claims, 11 Drawing Figures

FURROWING TOOL

This is a division of application Ser. No. 877,045, filed Feb. 13, 1978, now U.S. Pat. No. 4,216,832 which is a continuation of application Ser. No. 699,491, filed on June 24, 1976, now abandoned.

BACKGROUND OF THE INVENTION

In farming operations, especially when planting seeds for crops, it is the usual custom to precondition the soil of the field by advancing any number of known power driven machines over the field in order to break up the sod or soil and prepare the field for the implanting of seeds.

After the field has been pre-conditioned, automatic seed planting machines may be used wherein the automatic seed planting machines are advanced over the field and, while advancing over the field, first, create a furrow in the pre-conditioned soil; second, automatically distribute seeds in the open furrows; and, finally, cover the seeds by refilling the furrow with soil.

Generally, such automatic seeding machines have a power driven rotary steel disc that is adjustably positioned so as to engage the field surface and open a furrow in the field as the machine advances along over the field. This power driven rotary steel disc usually rotate in the direction of travel of the advancing machine and, being adjustable, may create a furrow to any desired depth, the usual depth of a furrow being up to about three inches deep. When such a power driven rotary steel disc is used in a pre-conditioned field, the performance of the steel disc and the tool life of the steel disc have been found quite satisfactory.

Automatic seeding machines, however, are also used in a number of situations where pre-conditioning the soil which is not desirable, for instance, in planting further seeds in an already existing pasture for livestock. When planting seeds in an already existing pasture, it is desirable to disturb only the soil necessary for the planting of the additional seeds while being careful not to disturb to any great extent the already existing vegetation in the pasture.

Other examples of situations where preconditioning of the soil would not be desirable would include the planting of seeds on hillside fields where, if too much soil is loosened, there is a danger of the fertile top soil being carried away by adverse weather conditions, such as high winds and heavy rains.

When the automatic seeding machines must work in circumstances where soil has not been preconditioned for the planting of the seeds, the steel disc used to open the furrows must operate under extremely harsh conditions. The steel disc must rip through solid soil, sod, imbedded rock and stubble, and other foreign material which is usually imbedded and held in place within the solid soil. Such harsh conditions are very abrasive upon the steel discs and significantly shorten the tool life of the discs and limit the effectiveness of the automatic seed planting machine.

It is an object of the present invention to provide a tool for use on an automatic seed planting machine that will have an extremely long life when used in abrasive soil conditions.

It is a further object of the present invention to provide discs having replaceable wear elements distributed around the periphery of the disc such that the discs, themselves, may be repaired when the bit elements become worn.

It is a further object of the present invention to lessen the down time for repair of such discs in an automatic seeding machine.

It is a further object of the present invention to provide a tool that, while having a significantly longer life than discs of the prior art, is still economically efficient when used upon such automatic seeding machines.

BRIEF SUMMARY OF THE INVENTION

According to the present invention, a steel disc is provided having generally planar sides with a peripheral surface joining the planar sides of the disc. The disc is adapted to be driven in rotation and mounted upon an automatic seeding machine. Bit-like elements are mounted in a distributed relation around the peripheral surface of the disc and the bit-like elements have a forward working portion for engagement with the field surface with compacts of hard wear resistant material comprising the leading edge of the forward working portion of the bits.

The steel-like discs used with the present invention may have a generally curved peripheral surface or may have right angled "V" shaped notches forming the peripheral surface of the disc. The bit elements that are mounted in distributed relation on the peripheral surface of the disc have a portion for attaching to the disc with the attachment portion of the bits comprising a slotted portion forming dependent legs on the bit-like elements with a locating surface on the bit-like elements joining said dependent legs on the bit-like elements.

The slotted portion may, in one type of bit-like element shown, be formed through the rearward end of the bit-like element and extend toward the forward working portion. When the slotted portion is formed in such a manner, the bit-like element is usually adapted to fit over the disc-like element having a curved peripheral surface. The bit-like element is mounted on the disc such that the central axis of the bit element forms an acute angle with a radius line of the disc with the forward working portion of the bit element pointing forwardly in the direction of rotation of the disc.

Another form of the bit element shown has a slotted portion formed along the side of the body of the bit element and these bit-like elements are placed upon the disc having the right angled "V" shaped notches forming the peripheral surface of the disc.

When these bit-like elements are put into the right angled "V" shaped notches, the locating surface on the bit element abuts against one of the legs of the "V" shaped notch and the rearmost end of the bit-like element may abut the other leg of the "V" shaped notch.

Such bits may be fastened on, either by welding or bolting, or any of the equivalent means thereof. The location of the slotted portion of the bits may vary from one bit to another such that the width of the furrow may be predetermined when constructing the disc and bit-like element combinations.

The leading edge of the forward working portion of the bit-like elements comprises a hard wear resistant material, preferably, cemented hard metal carbide material, such as tungsten carbide, and is conical in configuration at its foremost end. The compacts have a rearwardly facing abutment surface and a protrusion extending rearwardly from that abutment surface with said protrusion being telescopically engaged by a perforation formed in a forward portion of the bit element body. The compacts are held in the perforation by means such as brazing.

The exact nature of the present invention will become more clearly apparent upon reference to the following detailed specification taken in connection with the accompanying drawings in which.

DETAILED DESCRIPTION OF THE INVENTION

Figure 1:
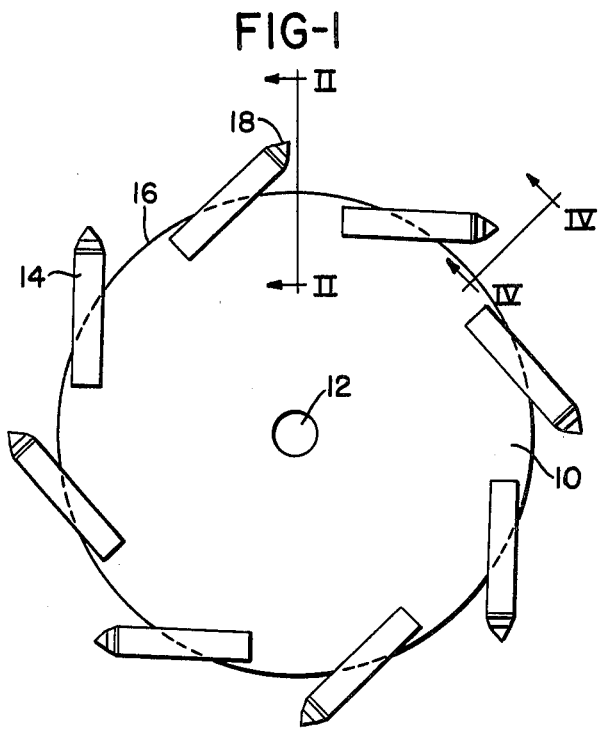
FIG. 1 is a side view of a disc with bit elements mounted thereon.

Referring to the drawings somewhat more in detail, what is shown in FIG. 1 is a rotary tool for opening a furrow in a field comprising a disc element 10, which is preferably made of a steel material, with the disc element 10 having a mounting hole 12 through its central axis so that it is adapted to be mounted upon an automatic seeding machine and driven in rotation while mounted thereon.

Bit-like elements 14 are shown mounted around the peripheral surface 16 of disc element 10, with these bit-like elements 14 having compacts of hard wear resistant material 18 forming the forward working portion of bit elements 14. As can be seen in FIG. 1, the peripheral surface 16 of disc element 10 may be a curved configuration such that bit elements 14 may locate thereon.

Figure 2:
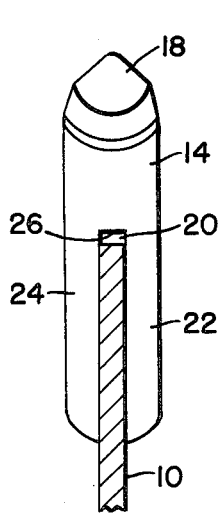
FIG. 2 is a view along section line II—II of FIG. 1.

What is shown in FIG. 2 is a view taken along line II—II of FIG. 1 which shows the bit element 14 having a compact of hard wear resistant material 18 becoming the forward working portion of bit element 14. Further, what is shown in FIG. 2 is a slotted portion 20 formed through the rearward end of bit element 14 and extending forwardly toward the forward working portion of bit element 14. Slotted portion 20 thereby forms dependent legs 22 and 24 and a locating surface 26 on bit element 14. Locating surface 26 joins dependent legs 22 and 24 on bit element 14.

Figure 3:
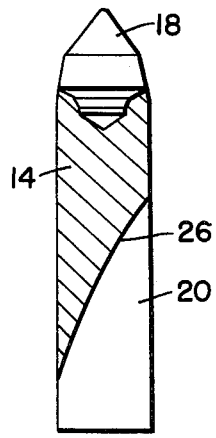
FIG. 3 is a cut away section of a bit as shown in FIG. 2.

With reference to FIG. 3, what is shown therein is a cut away section of a side view of the bit element 14 shown in FIG. 2 having a compact of hard wear resistant material 18 forming the leading edge of the forward working portion of bit element 14. The rearmost end of bit element 14 has slot 20 formed therein and locating surface 26 is shown having a curved configuration which is generally complementary to the curve of locating surface 16 of disc element 10.

Figure 4:
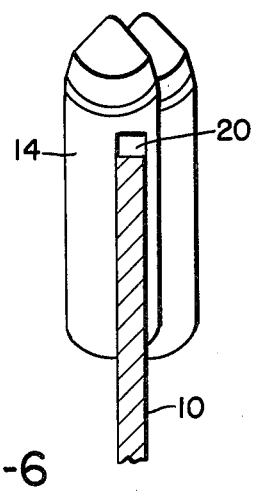
FIG. 4 is a view through section IV—IV of FIG. 1.

What is shown in FIG. 4 is a view through section IV—IV of FIG. 1 in that the slot 20 is formed in bit element 14 off center from the central axis of bit element 14 such that varying the location of the slots in each respective bit element 14 will enable one to construct a disc for varying widths of a furrow that may be desired.

Figure 5:
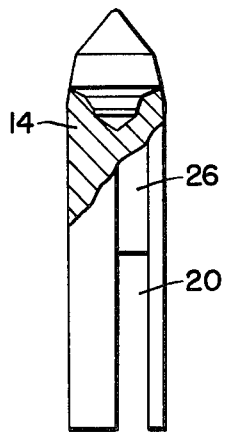
FIG. 5 is a side view of a modified bit of FIG. 1.

What is shown in FIG. 5 is a cut away section of a side view of the bit element 14 shown in FIG. 4. Bit element 14 is shown in FIG. 5 in a somewhat modified manner in that slot 20 is formed through the rearward portion of the bit element 14 but the locating surface 26, rather than having a complementary curve to the peripheral surface 16 of disc 10, is now presented as a planar surface which will furnish a point of abutment on peripheral surface 16 of disc 10.

Figure 6:
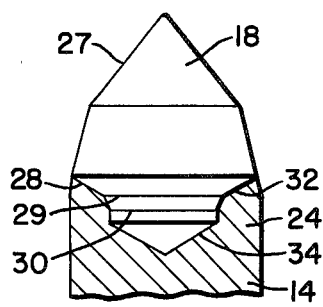
FIG. 6 is a detailed view of a compact seated in a bit body.

Referring now to FIG. 6, what is shown therein is a forward working portion 24 of bit element 14 having a compact 18 of hard wear resistant material forming the leading edge thereof. Compact 18 has a foremost section 27 having a conical configuration and a rearmost section 29 comprising a rearwardly facing abutment shoulder 28 and a protrusion 30 extending rearwardly from the abutment shoulder 28.

A bit element body 32 of bit element 14 has a perforation 34 formed near its forward end, said perforation telescopically engaged over the rearwardly extending protrusion 30 and abutting the abutment surface 28 on compact 18. Compact 18 is held in the bit element 14 by any common means of attachment such as brazing, and the like.

Figure 7:
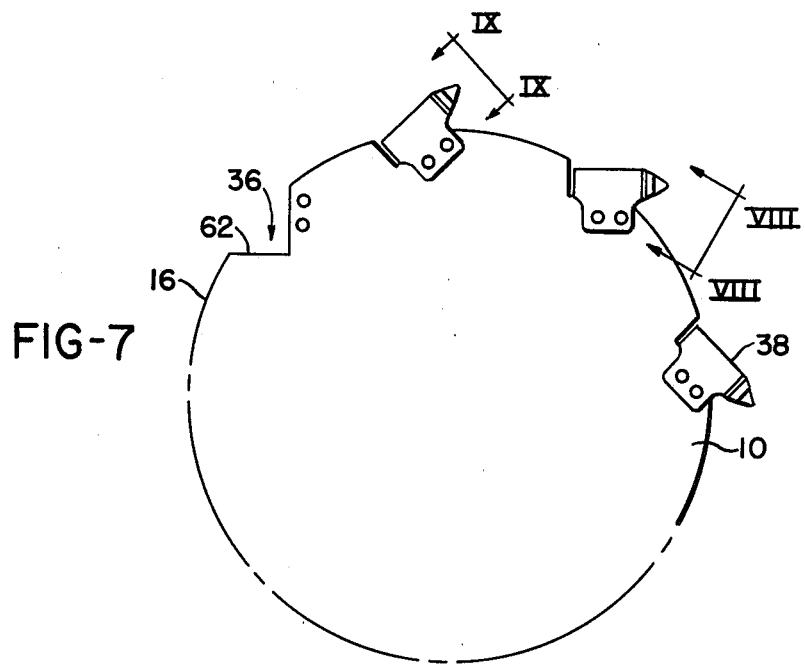
FIG. 7 is a side view of a disc with modified bits mounted therein.

Referring to FIG. 7, what is shown therein is a rotatable disc 10 having shown thereon right angled "V" notches 36 forming a part of the peripheral surface 16 of disc 10. The right angled "V" notches 36 are shown by way of example only to show a stepped type peripheral configuration that can be formed on the disc element 10 and upon which bit elements 38 may be located. Bit elements of the type shown at 38 have a slotted portion along a side thereof with a slotted portion forming a locating surface and dependent legs somewhat similar to what was shown in FIG. 2 above.

As can be seen by the stepped configuration, there is a radially outwardly facing abutment surface 60 on said disc and also an abutment surface 62 on the disc which faces in the direction of rotation of the disc 10.

Figure 8:
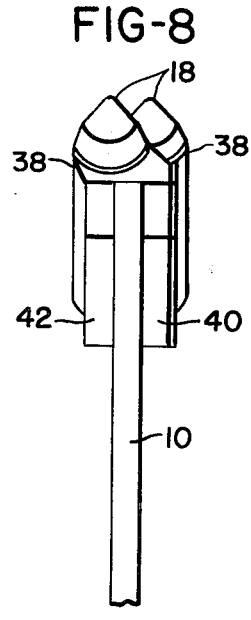
FIG. 8 is a view through section VIII—VIII of FIG. 7.

With reference to FIG. 8, what is shown therein is rotatable disc 10 having bit elements 38 mounted thereon as seen when viewed through line VIII—VIII of FIG. 7. A slotted portion formed along the side of bit element 38 creates dependent legs 40 and 42 which extend down over disc 10 and engage the general planar sides of disc 10. In FIG. 8, disc 10 is shown rotating toward the reader and hard wear resistant compacts 18 are shown as they would be rotating out of the page.

Figure 9:
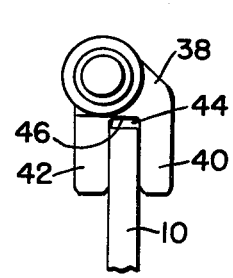
FIG. 9 is a view along line IX—IX of FIG. 7.

With reference to FIG. 9, which is a view taken through line IX—IX of FIG. 7, bit element 38 is shown mounted on disc 10 and the slotted portion 44 can be seen more clearly in FIG. 9. Dependent legs 42 and 40 are shown formed by slotted portion 44 and a locating surface 46 joins dependent legs 42 and 40 on bit element 38. The locating surface 46 abuts the peripheral surface of disc 10 on the radially outwardly facing abutment surface 36 as shown clearly above in FIG. 7.

It is to be noted in FIG. 9 that the longitudinal center axis of the body of bit element 38 is offset somewhat from the central axis of slot 44, it being the purpose that different bit elements 38 may be offset predetermined distances such that the width of furrows may be open by the rotary tool disclosed herein which may be variable.

Figure 11:
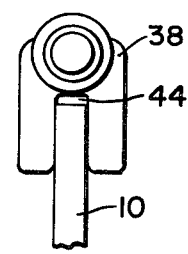
FIG. 11 is a modified front view of FIG. 9.

What is disclosed in FIG. 11 is a bit similar to bit element 30 similar to what is shown in FIG. 9 only here the central axis of slot 44 formed in body portion of bit element 38 is not offset from longitudinal central axis of bit member 38 as shown in FIG. 9.

Figure 10:
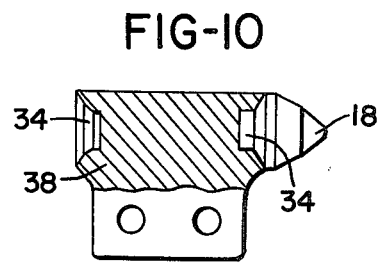
FIG. 10 is a side view of a bit body.

Referring now to FIG. 10, what is shown therein is a bit element 38 having perforations 34 formed in both ends thereof with the perforations 34 adapted to receive compact 18 as described with reference to FIG. 6. The purpose of forming perforations 34 in both ends of bit element 38 is that, when the central axis of the slot is offset from the longitudinal central axis of the bit body 38, only one body portion need be manufactured, depending on whether one would desire the offset to be on one side or the other of the slotted portion.

With reference to FIG. 9, it can be seen that bit member 38 could be removed from disc element 10 and turned end for end and replaced upon disc element 10 if no compacts 18 were yet affixed to the body of bit member 38. Thus, upon original manufacture, one is able to, at least, standardize the bit members 38 that must be carried in stock in order to manufacture a rotary tool according to the present invention.

Modifications may be made within the scope of the appended claims.

What is claimed is:

1. A rotary agricultural tool for opening a furrow in a field, comprising; a disc adapted to be driven in rotation, having generally planar sides and a notched peripheral surface when viewed in side view joining said sides; bit elements nonrotatably directly mounted on said notched peripheral surface and having a forward working portion for engagement with the field surface, and compacts of hard wear resistant material having a conical configuration at said compacts' foremost end comprising the fixed leading edge of said forward working portion.

2. A rotary agricultural tool according to claim 1 in which said bit elements are comprised of a slotted portion forming dependent legs and a locating surface on said bit element so that said leg portions engage respective planar sides of said disc and said locating surface abuts said notched peripheral surface of said disc.

3. A rotary tool according to claim 2 in which said slotted portion is formed along a side of said bit and extends rearwardly from said front working portion and said locating surface comprises the side surface of said bit joining the dependent legs.

4. A rotary agricultural tool according to claim 3 wherein said notched peripheral surface when viewed in side view comprises a radially outwardly facing abutment surface and an adjacent abutment surface facing in the direction of rotation of said disc and located rearwardly of said outwardly facing abutment surface.

5. A rotary tool according to claim 4 in which said bit element comprises said locating surface that abuts said radially outwardly facing abutment surface on said disc and a rearward end face on said bit that abuts said abutment surface on said disc that faces in the direction of rotation.

* * * * *